UNITED STATES PATENT OFFICE.

JOEL WILSON, OF DOVER, NEW JERSEY, ASSIGNOR TO THE CONCRETE IRON COMPANY, OF NEW JERSEY.

PROCESS OF TREATING POWDERY IRON ORE.

SPECIFICATION forming part of Letters Patent No. 467,361, dated January 19, 1892.

Application filed February 3, 1890. Serial No. 339,086. (Specimens.)

*To all whom it may concern:*

Be it known that I, JOEL WILSON, of Dover, in the county of Morris and State of New Jersey, have made an invention of a new and useful Process of Treating Powdery Iron Ore; and I do hereby declare that the following is a full, clear, and exact description and specification of the same.

My invention has reference to the powdery earthy oxides of iron or ores which are produced as by-products in other manufactures or are produced by handling iron ores. Among these raw materials may be mentioned the powdery residuum obtained by burning or roasting iron pyrites in the manufacture of sulphuric acid and the powdery iron ore which is produced in the handling of soft-iron ores. Such powdery raw-iron materials have not hitherto been suitable for direct treatment in the blast-furnace, because, being in a comminuted condition, they are carried off with the gases and clog the gas-flues of the blast-furnace.

The object of this invention is to enable such powdery raw-iron materials to be used satisfactorily in the blast-furnace for the manufacture of pig-iron.

To this end my invention consists of the process of vitrifying or melting the powdery raw-iron material or ore without materially reducing the oxide of iron or carbureting the iron and subsequently permitting the melted material to cool in a concrete condition or in cohering masses. The vitrification or melting of the powdery raw-iron material may be effected in any suitable furnace. I have used for the purpose a puddling-furnace, such as is used for puddling iron in the manufacture of wrought-iron, and I have also used with success an ordinary cupola furnace, such as is used for melting pig-iron in foundries; but the furnace which I prefer to use is a water-jacketed cupola furnace operated with a hot-blast heated by forcing the air through pipes heated by the waste heat of the gases proceeding from the cupola itself. As such furnaces are well known in the manufacture of iron, I do not deem it necessary to describe them in detail. In practicing my process with the powdery by-product of the manufacture of sulphuric acid the raw material, taken in the damp condition in which it exists when lying in the refuse heaps at the acid factories, is charged into the hot-blast cupola furnace alternately with sufficient anthracite coal to furnish the heat required to melt the material, and the molten material in a fluid state is permitted to run out of the top hole either upon iron plates or into iron molds, and is then allowed to cool, the cooling being expedited, if deemed expedient, by sprinkling the material with water. The concrete ore thus produced has the appearance of scoria, and is suitable for use in the blast-furnace, the said concrete ore being, if necessary, broken into fragments of suitable size for the blast-furnace, and it is smelted therein with a flux in substantially the same manner as native iron ores, so as to produce pig-iron.

My said process is distinguished, on the one hand, from the process of smelting iron ores directly in the blast-furnace by the fact that in the said blast-furnace operation the iron of the ore is reduced and carbureted, so that it separates in the molten condition from the earthy matter of the ore, whereas by my said process the iron of the ore is not carbureted and is not separated from the other earthy matter. The said process, also, is distinguished, on the other hand, from the processes of making iron sponge, by the fact that by them substantially all the iron of the ore is reduced to the metallic state, so that the earthy matter of the ore may be separated from the metallic iron by heating the sponge to a lower temperature than the melting-point of the reduced iron, whereas with my said process the iron of the ore remains substantially in the condition of oxide in the vitrified mass or concrete ore produced by that process, and the iron cannot be obtained from the concrete ore by the ordinary manufacturing processes without reducing the oxide to the metallic state or carbureting it.

I claim as my invention—

The process of treating powdery iron material by melting the same without reducing it to the metallic condition and then cooling the melted material into solid cohering masses.

In witness whereof I have hereto set my hand this 23d day of January, A. D. 1890.

JOEL WILSON.

Witnesses:
 HORACE L. DUNHAM,
 E. S. RENWICKS.